United States Patent
Otsubo et al.

(10) Patent No.: US 10,370,883 B2
(45) Date of Patent: Aug. 6, 2019

(54) APPARATUS FOR WINDOW

(71) Applicant: AGC Inc., Chiyoda-ku (JP)

(72) Inventors: Nozomi Otsubo, Chiyoda-ku (JP);
Masao Fukami, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 82 days.

(21) Appl. No.: 15/443,005

(22) Filed: Feb. 27, 2017

(65) Prior Publication Data

US 2017/0254131 A1 Sep. 7, 2017

(30) Foreign Application Priority Data

Mar. 1, 2016 (JP) .................................. 2016-039334

(51) Int. Cl.
| | |
|---|---|
| *E05D 15/10* | (2006.01) |
| *E05D 15/56* | (2006.01) |
| *E05F 11/32* | (2006.01) |
| *E05F 11/53* | (2006.01) |
| *B60J 1/16* | (2006.01) |

(Continued)

(52) U.S. Cl.
CPC .............. *E05D 15/101* (2013.01); *B60J 1/16* (2013.01); *B60J 1/1853* (2013.01); *E05D 15/10* (2013.01); *E05D 15/1013* (2013.01); *E05D 15/56* (2013.01); *E05D 15/565* (2013.01); *E05F 11/32* (2013.01); *E05F 11/535* (2013.01); *E06B 3/4627* (2013.01); *E06B 3/4645* (2013.01); *E05D 2015/1026* (2013.01); *E05Y 2900/55* (2013.01)

(58) Field of Classification Search
CPC .................. E05D 15/10; E05D 15/1005–1013

USPC ................................... 49/209, 213, 210, 216
See application file for complete search history.

(56) References Cited

U.S. PATENT DOCUMENTS

| | | | | |
|---|---|---|---|---|
| 3,398,486 A | * | 8/1968 | Cadiou | .................... B60J 7/061 |
| | | | | 296/222 |
| 4,317,312 A | * | 3/1982 | Heideman | ........... E05D 15/1042 |
| | | | | 49/220 |

(Continued)

FOREIGN PATENT DOCUMENTS

| | | |
|---|---|---|
| EP | 1 719 651 A1 | 11/2006 |
| EP | 1 920 957 A1 | 5/2008 |

(Continued)

*Primary Examiner* — Marcus Menezes
(74) *Attorney, Agent, or Firm* — Oblon, McClelland, Maier & Neustadt, L.L.P.

(57) ABSTRACT

An apparatus for window is used for moving a movable window plate among an insertion position for being inserted into an aperture portion of a fixed window plate, an extraction position for being extracted from the aperture portion toward an indoor side, and an opening position for being moved from the extraction position in a sliding direction that is different from an inserting and extracting direction to open the aperture portion. The apparatus includes a rotating shaft rotatably supported at a predetermined position for the movable window plate; a movement conversion mechanism configured to convert a rotation of the rotating shaft into a translation of the movable window plate between the insertion position and the extraction position; and a drive shaft, fixed to the rotating shaft, configured to rotate the rotating shaft around a central axis of the rotating shaft by revolving around the central axis of the rotating shaft.

14 Claims, 8 Drawing Sheets

(51) Int. Cl.
*B60J 1/18* (2006.01)
*E06B 3/46* (2006.01)

(56) References Cited

U.S. PATENT DOCUMENTS

| | | | | |
|---|---|---|---|---|
| 4,384,429 A | * | 5/1983 | Rokicki | E05D 15/1013 49/130 |
| 4,662,110 A | * | 5/1987 | Rokicki | E05D 15/1013 49/220 |
| 4,726,145 A | * | 2/1988 | Rokicki | E05D 15/1013 49/220 |
| 5,799,444 A | | 9/1998 | Freimark et al. | |
| 5,809,706 A | | 9/1998 | Neaux | |
| 5,996,284 A | * | 12/1999 | Freimark | B60J 1/1853 49/209 |
| 7,437,852 B2 | * | 10/2008 | Dufour | E05F 11/535 49/213 |
| 7,568,312 B2 | * | 8/2009 | Dufour | B60J 1/1853 49/216 |
| 7,584,574 B2 | * | 9/2009 | Kinross | B60J 1/1853 49/209 |
| 8,276,316 B2 | * | 10/2012 | Takeda | B60J 5/06 49/209 |
| 2002/0053166 A1 | | 5/2002 | Fries | |
| 2006/0174544 A1 | * | 8/2006 | Dufour | E05F 11/535 49/413 |
| 2012/0031004 A1 | * | 2/2012 | Boettcher | B60J 5/06 49/154 |
| 2014/0318017 A1 | * | 10/2014 | Linkner | B60J 5/047 49/176 |

FOREIGN PATENT DOCUMENTS

JP 9-175171 7/1997
WO WO 2010/095029 A2 8/2010

* cited by examiner

APPARATUS FOR WINDOW

CROSS-REFERENCE TO RELATED APPLICATION

The present application is based on and claims benefit of priority under 35 U.S.C. § 119 of Japanese Patent Application No. 2016-039334, filed Mar. 1, 2016. The contents of the application are incorporated herein by reference in their entirety.

BACKGROUND OF THE INVENTION

1. Field of the Invention

The disclosure herein generally relates to an apparatus for window.

2. Description of the Related Art

An apparatus for closing an aperture formed on a vehicle body, disclosed in Japanese Unexamined Patent Application Publication No. 9-175171 is provided with a fixture panel adhering on a periphery of the aperture formed on the vehicle body, and a panel for closing an aperture formed on the fixture panel (in the following, referred to as a movable panel). The movable panel moves from a position for closing the aperture of the fixture panel toward an indoor side, and thereby opens the aperture of the fixture panel.

SUMMARY OF THE INVENTION

It is a general object of at least one embodiment of the present invention to provide an apparatus for window, in which an operation force required for inserting and extracting a movable window plate through the aperture of the fixed window plate is reduced.

In order to achieve the above-described purpose, according to an embodiment of the present invention, an apparatus for window used for moving a movable window plate among an insertion position for being inserted into an aperture portion of a fixed window plate, an extraction position for being extracted from the aperture portion toward an indoor side, and an opening position for being moved from the extraction position in a sliding direction that is different from an inserting and extracting direction to open the aperture portion, the apparatus includes a rotating shaft that is rotatably supported at a predetermined position for the movable window plate; a movement conversion mechanism configured to convert a rotation of the rotating shaft into a translation of the movable window plate between the insertion position and the extraction position; and a drive shaft, fixed to the rotating shaft, configured to rotate the rotating shaft around a central axis of the rotating shaft by revolving around the central axis of the rotating shaft, is provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1:
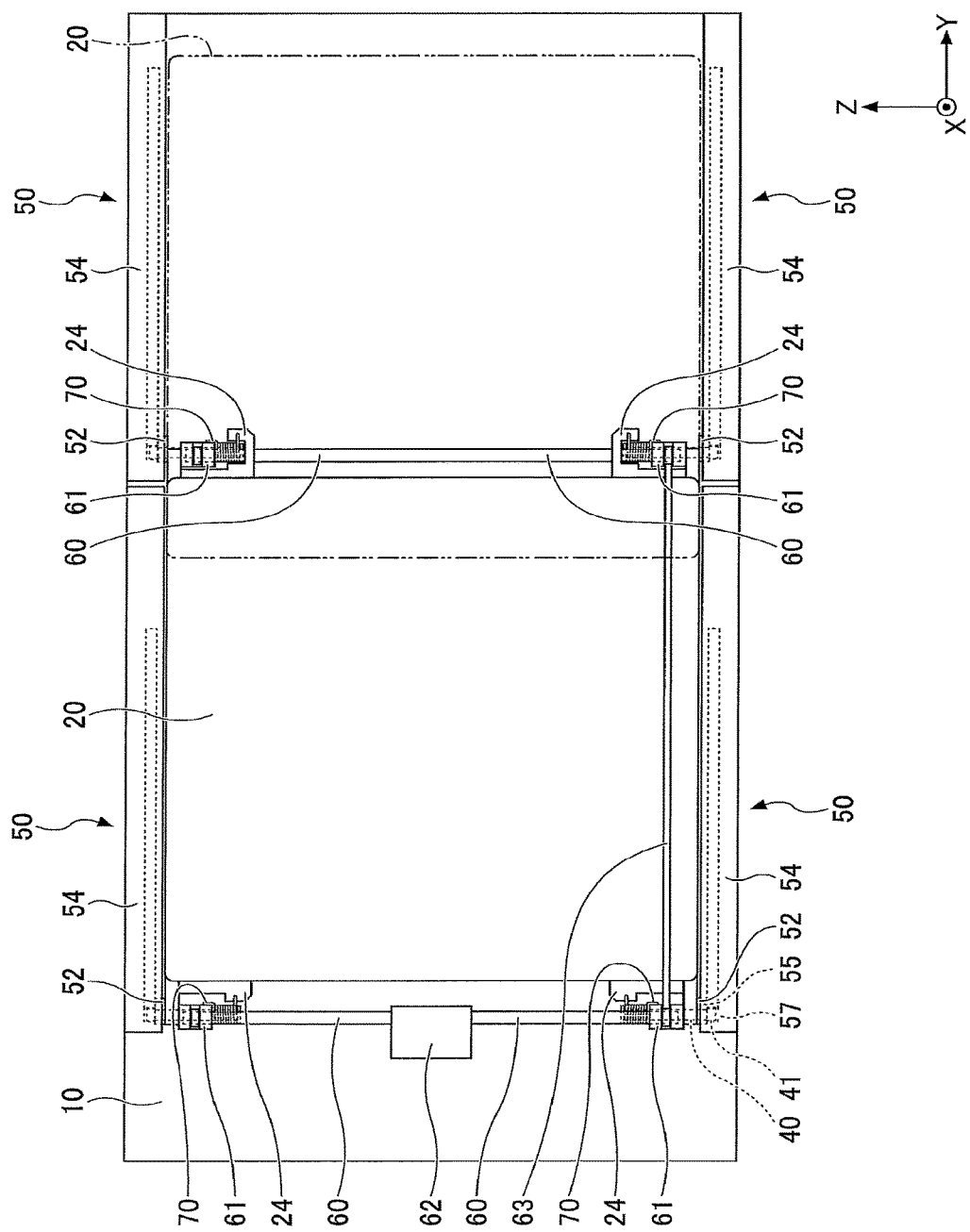
FIG. 1 is a diagram depicting an entire apparatus for window according to a first embodiment.

In the following, embodiments of the present invention will be described with reference to the accompanying drawings. In each drawing, to the same or corresponding members, the same or corresponding reference numeral is assigned, and an explanation may be omitted. In each drawing, X-direction is an inserting and extracting direction, Y-direction is a direction different from the X-direction and is a sliding direction, and Z-direction is a direction different from the X-direction and the Y-direction. In each drawing, the X-direction, the Y-direction and the Z-direction are orthogonal to each other. However, the invention is not limited to this, and the directions may cross in a diagonal fashion.

In the specification of the present application, "rotating" refers to a case where a rotating shaft is inside an object, and "revolving" refers to a case where the rotating shaft is outside the object.

First Embodiment

Figure 2:
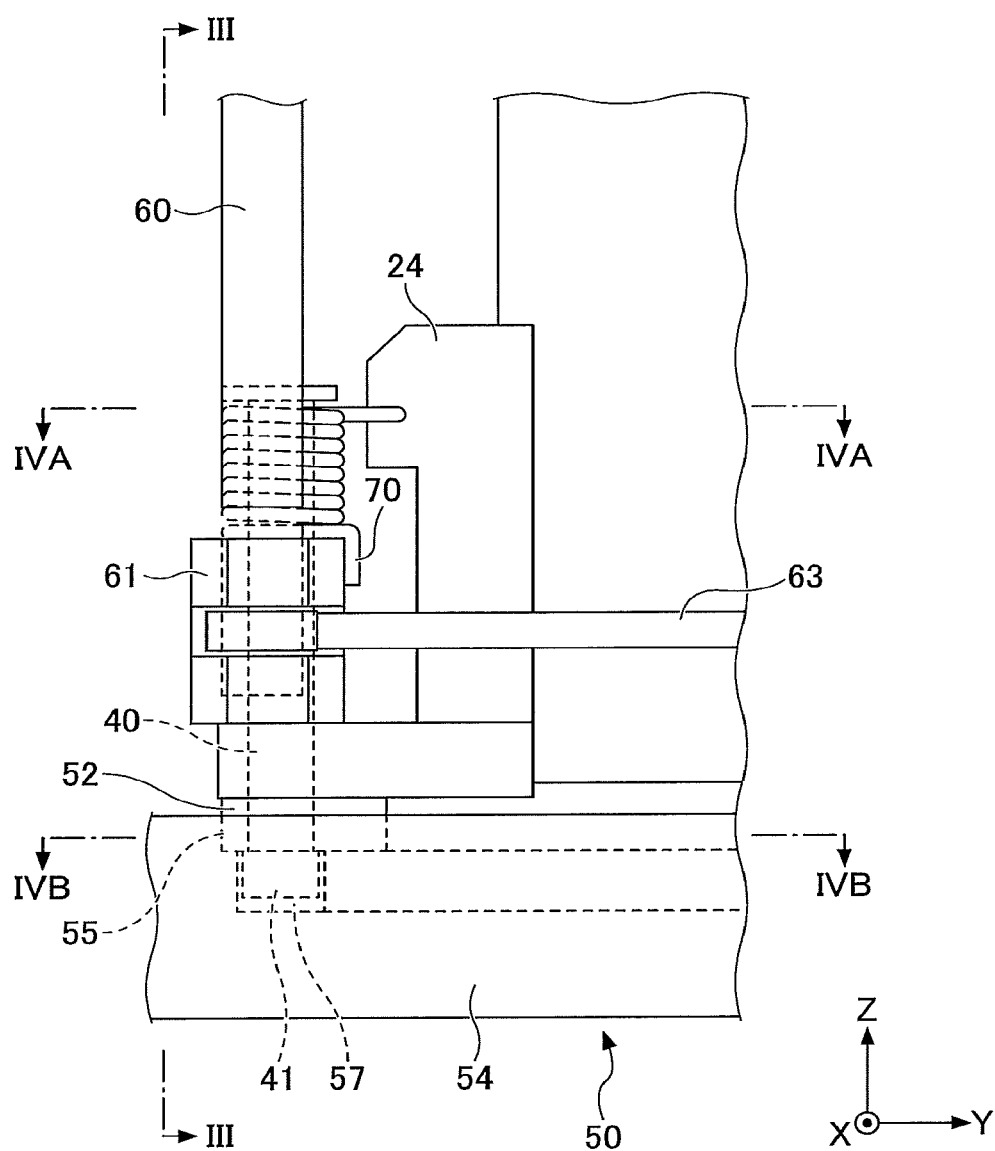
FIG. 2 is an enlarged diagram depicting a main part of the apparatus for window illustrated in FIG. 1.
Figure 3:
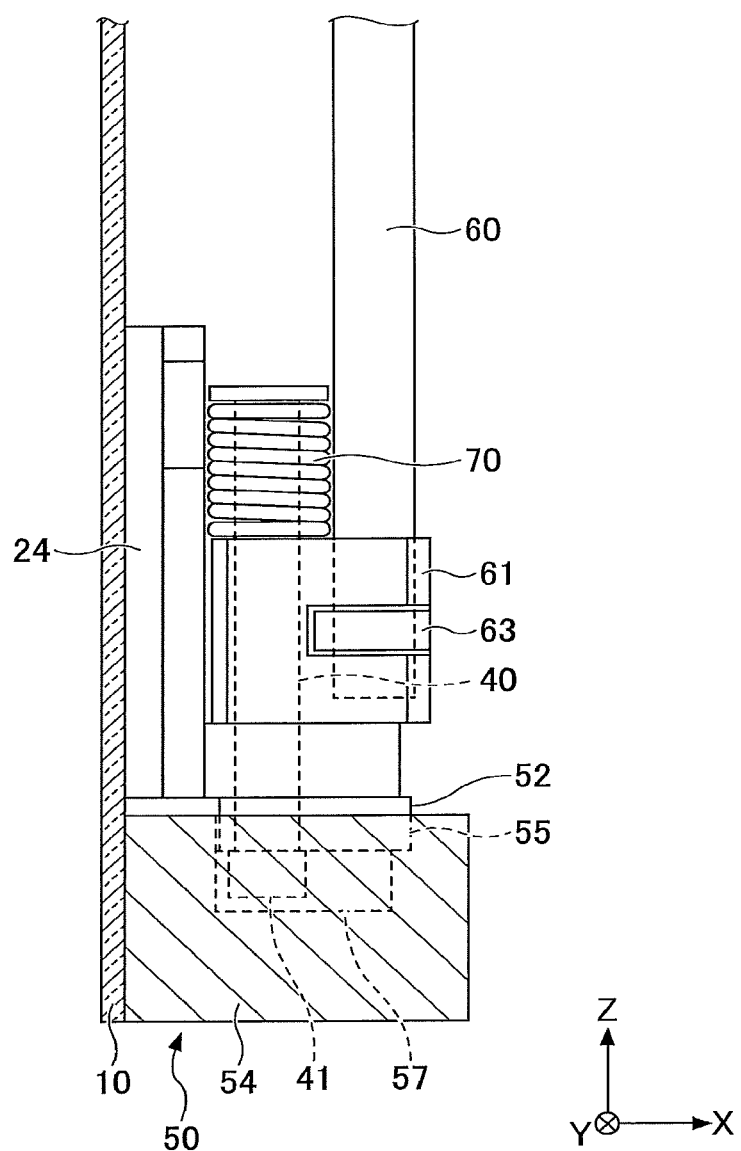
FIG. 3 is a cross-sectional diagram cut along a line illustrated in FIG. 2.
Figure 4A:
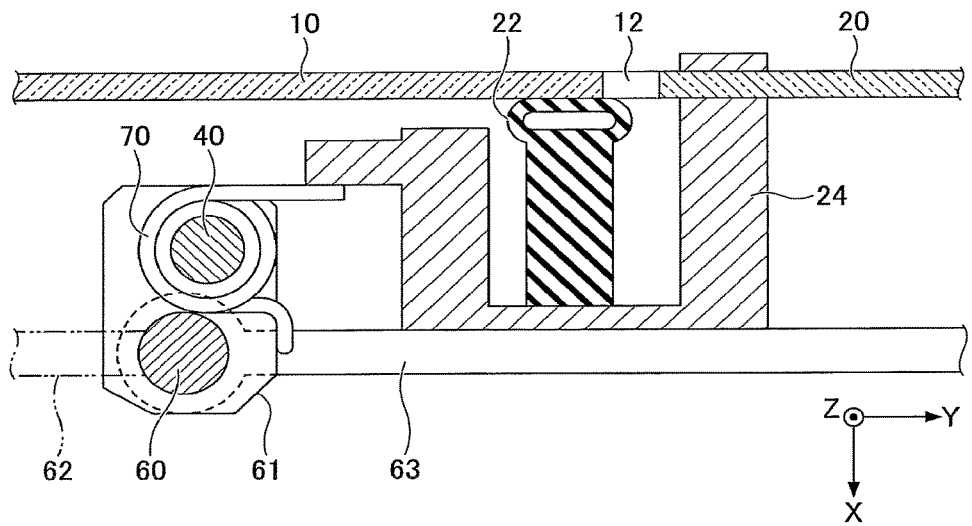
FIGS. 4A and 4B are cross-sectional diagrams depicting a state of the apparatus for window when a movable window plate is located at an insertion position according to the first embodiment.
Figure 4B:
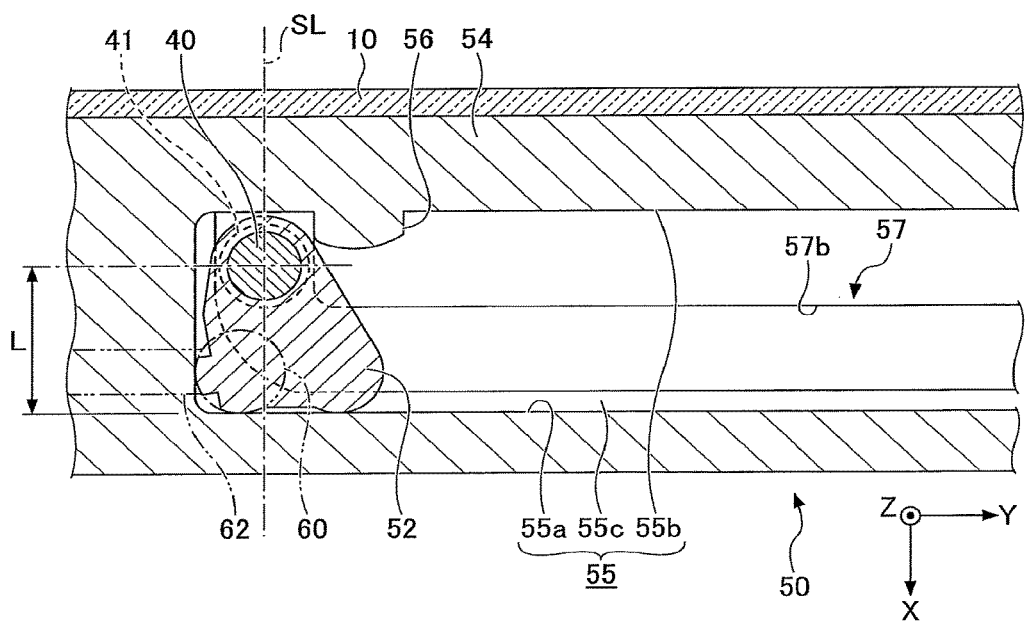
Figure 5A:
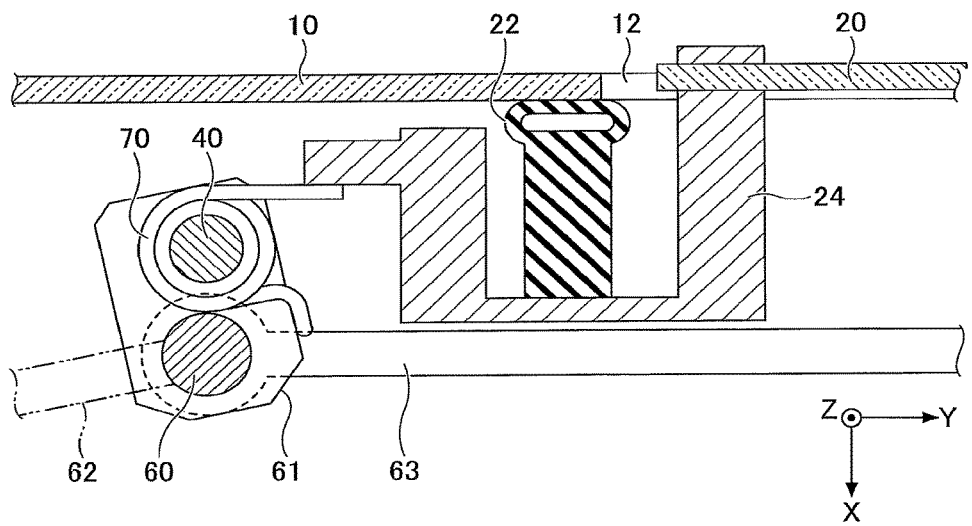
FIGS. 5A and 5B are cross-sectional diagrams depicting a state of the apparatus for window when the movable window plate is located at a protrusion position according to the first embodiment.
Figure 5B:
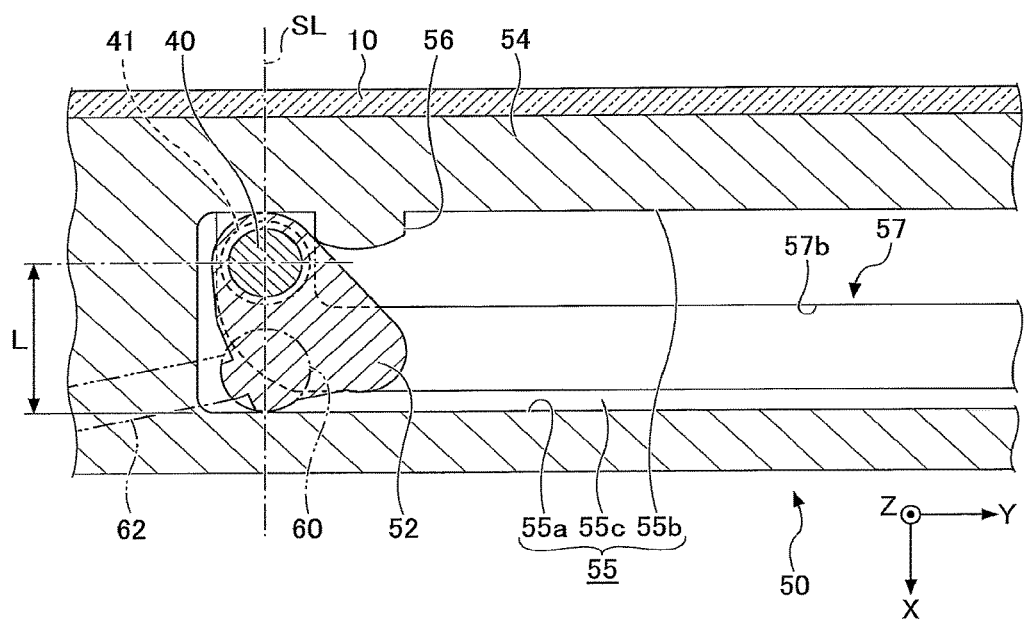
Figure 6A:
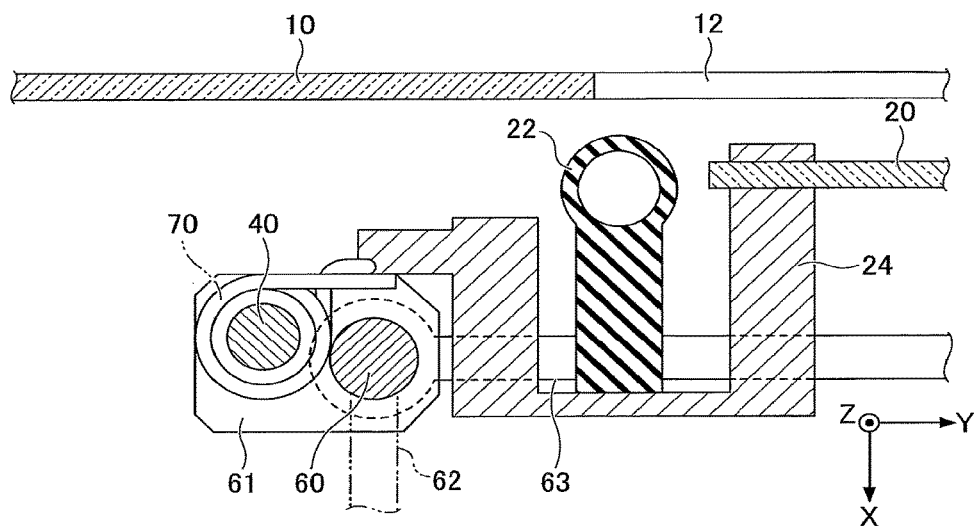
FIGS. 6A and 6B are cross-sectional diagrams depicting a state of the apparatus for window when the movable window plate is located at an extraction position according to the first embodiment.
Figure 6B:
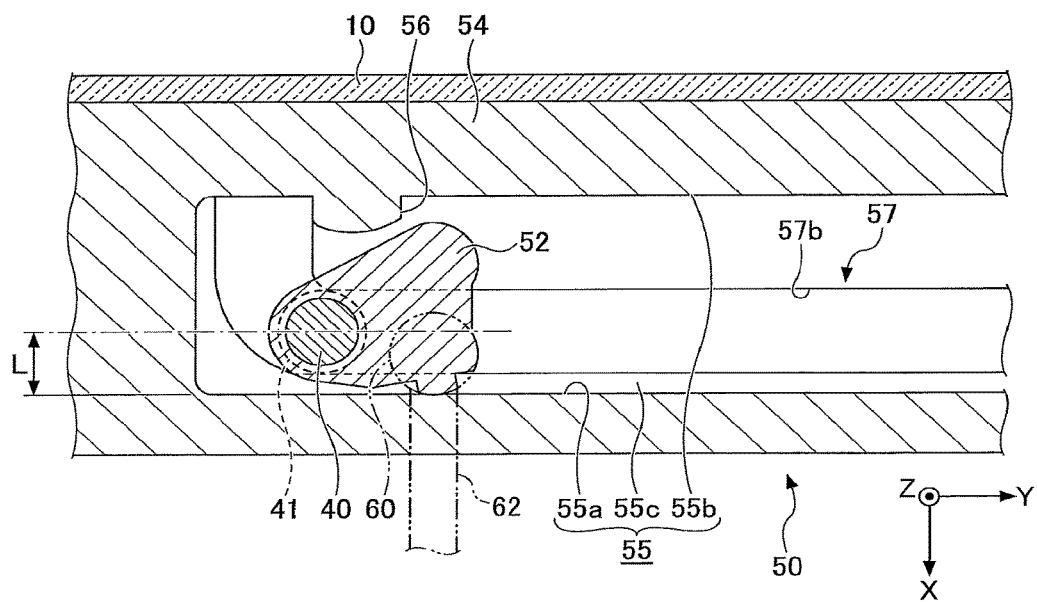

FIG. 1 is a diagram depicting an entire apparatus for window according to a first embodiment. In FIG. 1, a solid line indicates a state when a movable window plate 20 is located at an insertion position, and a two-dot chain line indicates a state when the movable window plate 20 is located at an opening position. FIG. 2 is an enlarged diagram depicting a main part of the apparatus for window illustrated in FIG. 1. FIG. 3 is a cross-sectional diagram cut along a line illustrated in FIG. 2. In FIGS. 1 to 3, illustration of a sealing member illustrated in FIGS. 4A to 6B will be omitted for the sake of simplicity. FIGS. 4A and 4B are cross-sectional diagrams depicting a state of the apparatus for window when the movable window plate 20 is located at the insertion position according to the first embodiment. FIG. 4A is a cross-sectional diagram cut along a IVA-IVA line illustrated in FIG. 2, and illustrating a relation between a rotating shaft 40 and a drive shaft 60. FIG. 4B is cross-sectional diagram cut along a IVB-IVB line illustrated in FIG. 2, and illustrating a relation between a fixture guide and a cam 52. FIGS. 5A and 5B are cross-sectional diagrams depicting a state of the apparatus for window when the movable window plate 20 is located at a protrusion position according to the first embodiment. FIG. 5A is a cross-sectional diagram illustrating a relation between the rotating shaft 40 and the drive shaft 60. FIG. 5B is cross-sectional diagram illustrating a relation between the fixture guide and the cam 52. FIGS. 6A and 6B are cross-sectional diagrams depicting a state of the apparatus for window when the movable window plate 20 is located at an extraction position according to the first embodiment. FIG. 6A is a cross-sectional diagram illustrating a relation between the rotating shaft 40 and the drive shaft 60. FIG. 6B is cross-sectional diagram illustrating a relation between the fixture guide and the cam 52. In FIGS. 4A to 6B, an upper side of the fixed window plate 10 is referred to as an outdoor side, and a lower side of a fixed window plate 10 is referred to as an indoor side. Moreover, in FIGS. 4A to 6B, an operation member 62 or the like is projected in the Z-direction and illustrated using a two-dot chain line so that a rotational angle of the rotating shaft 40 or a rotational angle of a revolving shaft can be visually understood.

The fixed window plate 10 is arranged in an aperture portion of a vehicle such as a car, in an aperture portion of a building, or the like. In the following in the specification of the present application, a case where the fixed window plate 10 is arranged in the aperture portion of the vehicle will be illustrated. The fixed window plate 10 is made of a transparent material, such as a glass or a resin. The fixed window plate 10 may have a single layered structure or a multi-layered structure. The fixed window plate 10 includes an aperture portion 12 (see FIGS. 4A to 6B).

The movable window plate 20, similarly to the fixed window plate 10, is made of a transparent material, such as a glass or a resin. The movable window plate 20 is inserted into the aperture portion 12 of the fixed window plate 10. At this time, a sealing member 22 (see FIGS. 4A to 6B) seals a gap between the fixed window plate 10 and the movable window plate 20. The sealing member 22 is arranged along an outer periphery of the movable window plate 20, and, for example, arranged at a bracket 24, which will be described later.

The movable window plate 20 moves among an insertion position for being inserted into the aperture portion 12 of the fixed window plate 10, an extraction position for being moved in the X-direction from the insertion position and extracted from the aperture portion 12, and an opening position for being moved in the Y-direction from the extraction position to open the aperture portion. At the insertion position, the movable window plate 20 and the fixed window plate 10 are made flush with each other, as illustrated in FIG. 4A, and a continuous surface is formed from the movable window plate 20 to the fixed window plate 10. Accordingly, a noise such as a travelling wind can be reduced.

The apparatus for window is used for moving the movable window plate 20 to/from the fixed window plate 10. The apparatus for window includes, for example, the rotating shaft 40, a movement conversion mechanism 50, the drive shaft 60, and an elastic member 70.

The rotating shaft 40 is rotatably supported at a predetermined position for the movable window plate 20. For example, the bracket 24 is attached to the movable window plate 20, and the bracket 24 supports the rotating shaft 40 rotatably. An axis direction of the rotating shaft 40 is the Z-direction.

The movement conversion mechanism 50 converts rotation of the rotating shaft 40 into translation of the movable window plate 20 between the insertion position and the extraction position. The movement conversion mechanism 50 will be described later in detail.

The drive shaft 60 is fixed to the rotating shaft 40 via a connecting link 61. The drive shaft 60 rotates the rotating shaft 40 around a central axis of the rotating shaft 40 by revolving around the central axis of the rotating shaft 40. An axis direction of the drive shaft 60 is the Z-direction.

A torque for rotating the rotating shaft 40 is expressed by a product of an operation force and a distance from the central axis of the rotating shaft 40.

According to the embodiment, when a crew rotates the rotating shaft 40, the crew can rotate the rotating shaft 40 by using the drive shaft 60. In this case, the operation force is given to the drive shaft 60, and the distance from the central axis of the rotating shaft 40 is greater by a distance between the central axis of the rotating shaft 40 and a central axis of the drive shaft 60, which are parallel to each other. Therefore, when torques for rotating the rotating shaft 40 are the same, the operation force can be made smaller than that in the case of rotating the rotating shaft 40 by giving the operation force to the rotating shaft 40 itself.

A number of the drive shafts 60 is, for example, two, as illustrated in FIG. 1. Two drive shafts 60 are connected to each other via a synchronization link 63, and revolve simultaneously and with the same angle. A range of motion of the synchronization link 63 in the X-direction for the movable window plate 20 is narrow, as illustrated in FIGS. 4A to 6B, and downsizing of the apparatus for window becomes possible.

At one of the drive shafts 60, as illustrated in FIG. 1, the operation member 62 for giving an operation force is arranged. For example, the operation member 62 may be a handle that the crew operates or the like. Because the operation member 62 is arranged at the drive shaft 60, compared with the case of being arranged at the rotating shaft 40, a length of the operation member 62 can be made shorter by a distance between the central axis of the drive shaft 60 and the central axis of the rotating shaft 40. Therefore, the operation member 62 can be prevented from protruding to a structure around the movable window plate 20 toward an indoor side.

The rotating shafts 40 are connected respectively via the connecting links 61 to both end portions of the drive shafts 60 in the axis direction. A number of the rotating shafts 40 is, for example, four in the case where the rotating shafts 40 are arranged at four corners of the movable window plate 20.

The number of the drive shafts 60 or the number of the rotating shafts is not particularly limited. The number of the drive shafts 60 only has to be one or more. Similarly, the number of the rotating shafts 40 only has to be one or more.

The elastic member 70 biases the rotating shaft 40 in a clockwise direction in FIGS. 4A to 6B. As the elastic member 70, for example, a torsion coil spring is used. One end portion of the torsion coil spring is fixed at the bracket 24, and another end portion of the torsion coil spring is fixed at the connecting link 61. A coil portion of the torsion coil spring surrounds the rotating shaft 40.

The movement conversion mechanism 50, as described above, converts rotation of the rotating shaft 40 into translation of the movable window plate 20 between the insertion position and the extraction position. The movement conversion mechanism 50 includes, for example, the cam 52, and a fixture guide 54. The cam 52 is, as illustrated in FIGS. 4A to 6B, fixed at the rotating shaft 40, and rotates along with the rotating shaft 40. The fixture guide 54 is fixed at the fixed window plate 10, has a cam guide groove 55 for guiding the cam 52, and is in contact with an outer periphery of the cam 52 on a wall surface 55a of the cam guide groove 55 on the indoor side. The wall surface 55a of the cam guide groove 55 on the indoor side is assumed to be parallel to a main surface of the fixed window plate 10. Here, the term "parallel" is not limited to a positional relationship of parallel in a strict sense, but deviations within a range of not interfering with functions are allowed.

As illustrated in FIGS. 4A to 6B, while revolving the drive shaft 60 to rotate the rotating shaft 40, the wall surface 55a of the cam guide groove 55 on the indoor side is always in contact with the outer periphery of the cam 52. Therefore, a distance L between the wall surface 55a of the cam guide groove 55 on the indoor side and the central axis of the rotating shaft 40 varies in response to a rotational angle of the rotating shaft 40. The distance L is measured in the X-direction. In response to a change of the distance L, the movable window plate 20 moves between the insertion position and the extraction position.

As illustrated in FIG. 4A, when the movable window plate 20 is located at the insertion position, as illustrated in FIG. 4B, the wall surface 55a of the cam guide groove 55 on the indoor side is in contact with the outer periphery of the cam 52 at two points on both sides of a reference line SL. Here, the reference line SL is a line perpendicular to the main surface of the fixed window plate 10, and goes through the central axis of the rotating shaft 40. In this state, when the main surface of the movable window plate 20 on the outdoor side is pushed toward the indoor side, the rotating shaft 40 supported rotatably at a predetermined position for the movable window plate 20 is pushed toward the indoor side along the reference line SL. At this time, the cam 52 fixed at the rotating shaft 40, on both sides of the reference line SL, is pushed back to the wall surface 55a of the cam guide groove 55 on the indoor side. Therefore, the cam 52 can be prevented from rotating, the movable window plate 20 can be prevented from moving to the extraction position, and thereby an intrusion from outside can be prevented.

When the movable window plate 20 is located at the insertion position, the wall surface 55a of the cam guide groove 55 on the indoor side is in point contact with the outer periphery of the cam 52. However, the wall surface may be in surface contact with the outer periphery. When the movable window plate 20 is located at the insertion position, the wall surface 55a of the cam guide groove 55 on the indoor side only has to be in contact with the outer periphery of the cam 52 on both sides of the reference line SL.

The fixture guide 54 includes a convex portion 56 on a wall surface 55b of the cam guide groove 55 on the outdoor side. While the movable window plate 20 is moved between the insertion position and the extraction position, the cam 52 climbs over the convex portion 56. By the above-described configuration, a direction of the cam 52 can be reliably changed.

The fixture guide 54 has a shaft guide groove 57 for guiding an extension shaft 41 of the rotating shaft 40 on a groove bottom surface 55c of the cam guide groove 55. While the movable window plate 20 is slid in the Y-direction between the extraction position and the opening position, the elastic member 70 biases the rotating shaft 40 in a predetermined rotational direction (clockwise direction in FIGS. 4A to 6B), thereby pressing the extension shaft 41 against a wall surface 57b of the shaft guide groove 57 on the outdoor side, and pressing the cam 52 against the wall surface 55a of the cam guide groove 55 on the indoor side. By the above-described configuration, looseness can be eliminated, and the movable window plate 20 can be prevented from vibrating.

Next, with reference to FIGS. 1 to 6B again, an operation of the apparatus for window of the above-described configuration will be described. First, an operation for causing the movable window plate 20 to move from the insertion position to the opening position through the extraction position will be described.

An operator operates the operation member 62 against an elastic restoring force or the like of the elastic member 70, to revolve the drive shaft 60 around the central axis of the rotating shaft 40 in the counter clockwise direction from the position illustrated in FIG. 4A to the position illustrated in FIG. 6A. As a result, the rotating shaft 40 rotates in the counter clockwise direction from the position illustrated in FIG. 4A to the position illustrated in FIG. 6A.

While the drive shaft 60 revolves in the counter clockwise direction, as illustrated in FIGS. 4B, 5B and 6B, the wall surface 55a of the cam guide groove 55 on the indoor side is always in contact with the outer periphery of the cam 52, a distance L between the wall surface 55a of the cam guide groove 55 on the indoor side and the central axis of the rotating shaft 40 varies in response to a rotational angle of the rotating shaft 40. In response to a change of the distance L, the movable window plate 20 moves from the insertion position to the extraction position.

While the drive shaft 60 revolves in the counter clockwise direction, the central axis of the drive shaft 60 is located on the indoor side of the central axis of the rotating shaft 40, and goes through the reference line SL in the middle (see FIG. 5B). At this time, the distance L reaches the maximum value, and the movable window plate 20 is located at the protrusion position.

In this way, the movable window plate 20 moves from the insertion position illustrated in FIG. 4A to the extraction position on the indoor side of the insertion position (see FIG. 6A), through the protrusion position on the outdoor side of the insertion position (see FIG. 5A). The movable window plate 20 first moves from the insertion position to the outdoor side, and after adhered substances adhering around a boundary between the movable window plate 20 and the fixed window plate 10, such as snow, frost, or water drops, fall to the outdoor side, the movable window plate 20 moves to the indoor side. Therefore, the adhered substances can be prevented from intruding into the indoor side.

Afterwards, the operator pushes the operation member 62 or the like in the rightward direction in FIG. 1, and thereby slides the movable window plate 20 in the Y-direction from the extraction position to the opening position.

Next, an operation of the apparatus for window for causing the movable window plate 20 to move from the opening position to the insertion position through the extraction position will be described.

The operator pushes the operation member 62 or the like in the leftward direction in FIG. 1, and thereby slides the movable window plate 20 in the Y-direction from the opening position to the extraction position.

Afterwards, the operator operates the operation member 62 against an elastic restoring force or the like of the sealing member 22, to revolve the drive shaft 60 around the central axis of the rotating shaft 40 in the clockwise direction from the position illustrated in FIG. 6A to the position illustrated in FIG. 4A. As a result, the rotating shaft 40 rotates around the central axis in the clockwise direction from the position illustrated in FIG. 6A to the position illustrated in FIG. 4A.

While the drive shaft 60 revolves in the clockwise direction, as illustrated in FIGS. 6B, 5B and 4B, the wall surface 55a of the cam guide groove 55 on the indoor side is always in contact with the outer periphery of the cam 52, a distance L between the wall surface 55a of the cam guide groove 55 on the indoor side and the central axis of the rotating shaft 40 varies in response to a rotational angle of the rotating shaft 40. In response to a change of the distance L, the movable window plate 20 moves from the extraction position to the insertion position.

While the drive shaft 60 revolves in the clockwise direction, the central axis of the drive shaft 60 is located on the indoor side of the central axis of the rotating shaft 40, and goes through the reference line SL in the middle (see FIG. 5B). At this time, the distance L reaches the maximum value, and the movable window plate 20 is located at the protrusion position.

In this way, the movable window plate 20 moves from the extraction position illustrated in FIG. 6A to the insertion position illustrated in FIG. 4A, through the protrusion position illustrated in FIG. 5A. When the movable window plate 20 is located at the insertion position, the movable window plate 20 and the fixed window plate 10 are made flush with each other, and a continuous surface is formed from the movable window plate 20 to the fixed window plate 10. Accordingly, a noise such as a travelling wind can be reduced.

Second Embodiment

Figure 7:
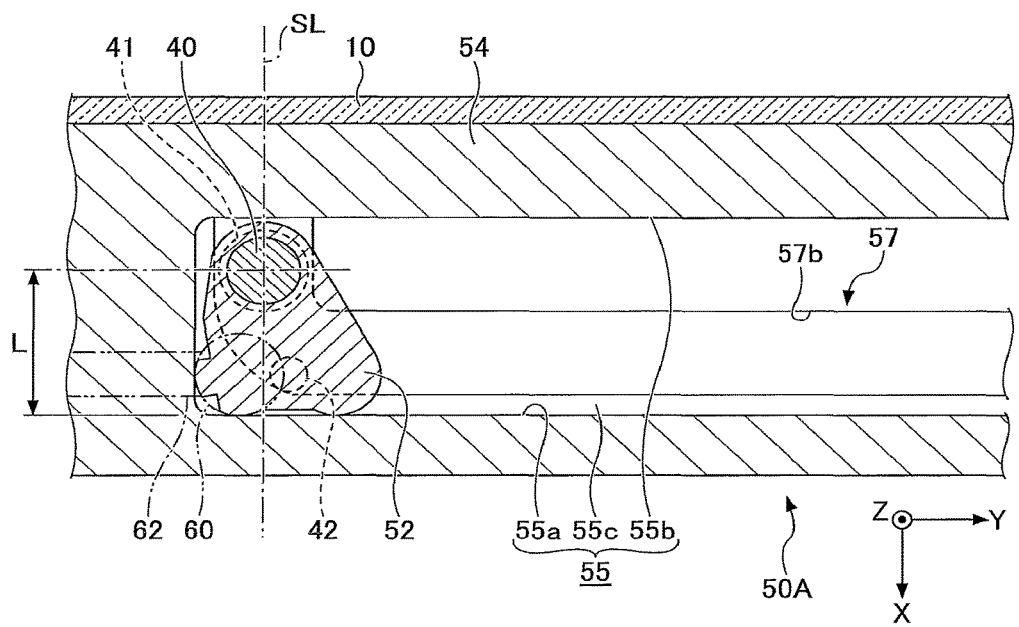
FIG. 7 is a cross-sectional diagram depicting a state of the apparatus for window when a movable window plate is located at an insertion position according to a second embodiment.
Figure 8:
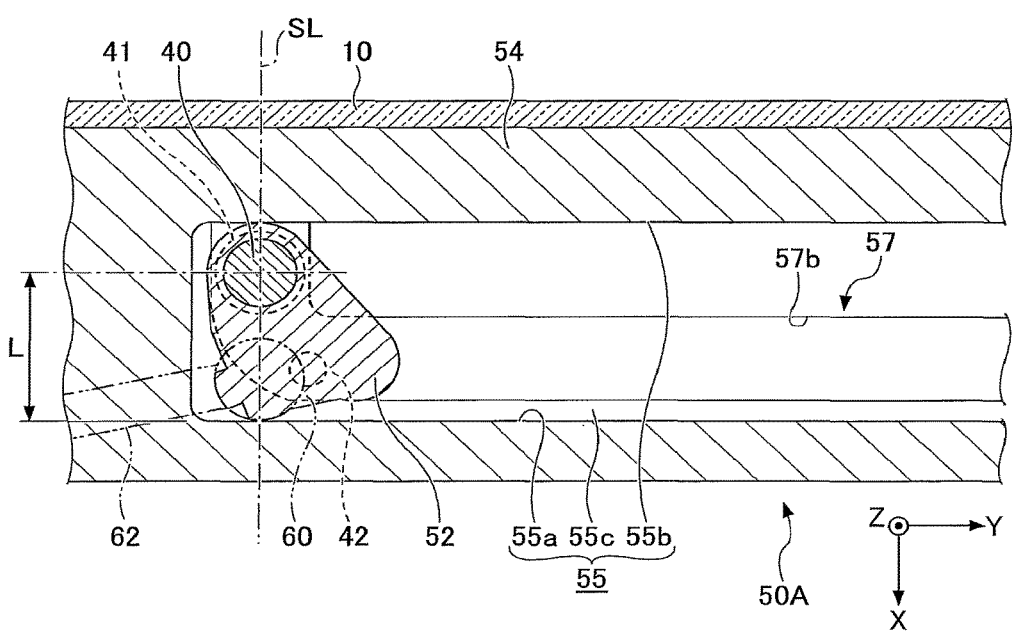
FIG. 8 is a cross-sectional diagram depicting a state of the apparatus for window when the movable window plate is located at a protrusion position according to the second embodiment.
Figure 9:
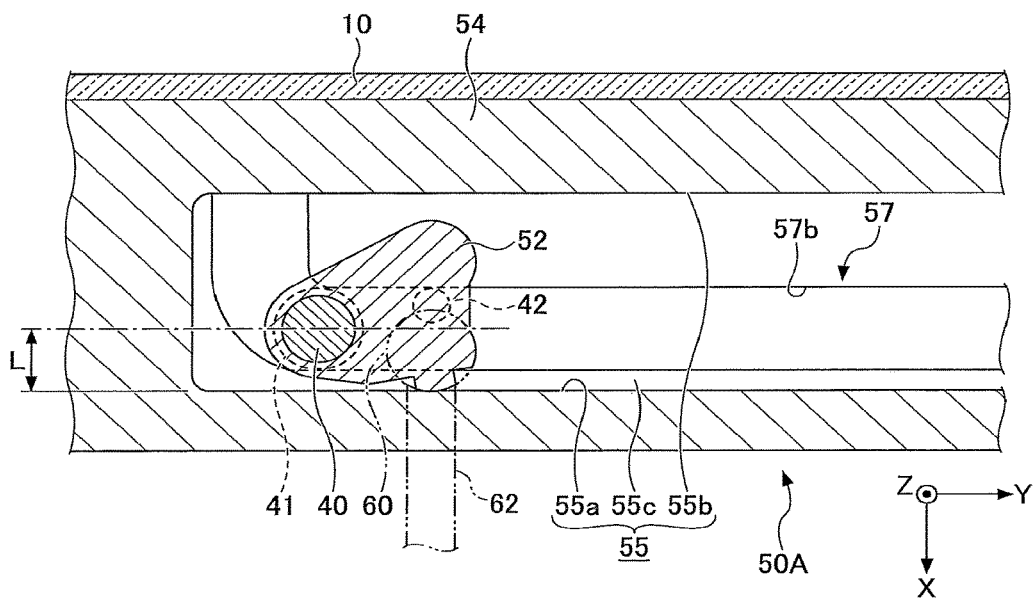
FIG. 9 is a cross-sectional diagram depicting a state of the apparatus for window when the movable window plate is located at a extraction position according to the second embodiment.

An apparatus for window according to an embodiment has a movement conversion mechanism 50A that is different from that of the apparatus for window according to the first embodiment. With reference to FIGS. 7 to 9, a difference from the first embodiment will be mainly described as follows.

FIG. 7 is a cross-sectional diagram depicting a state of the apparatus for window when a movable window plate is located at an insertion position according to a second embodiment. FIG. 7 is a cross-sectional diagram corresponding to FIG. 4B. FIG. 8 is a cross-sectional diagram depicting a state of the apparatus for window when the movable window plate is located at a protrusion position according to the second embodiment. FIG. 8 is a cross-sectional diagram corresponding to FIG. 5B. FIG. 9 is a cross-sectional diagram depicting a state of the apparatus for window when the movable window plate is located at an extraction position according to the second embodiment. FIG. 9 is a cross-sectional diagram corresponding to FIG. 6B.

The movement conversion mechanism 50A converts rotation of the rotating shaft 40 into translation of the movable window plate 20 between the insertion position and the extraction position. The movement conversion mechanism 50A includes, for example, the cam 52 and the fixture guide 54.

As illustrated in FIGS. 7 to 9, the cam 52 is fixed at the rotating shaft 40, and rotates along with the rotating shaft 40. The cam 52 is provided with the eccentric shaft 42 in addition to the extension shaft 41.

The eccentric shaft 42 is inserted in the shaft guide groove 57 along with the extension shaft 41. The eccentric shaft 42 is eccentric to the extension shaft 41, and has a smaller shaft diameter than that of the extension shaft 41. Because the diameter of the eccentric shaft 42 is smaller than the groove width of the shaft guide groove 57, the cam 52 can rotate.

The fixture guide 54 is fixed at the fixed window plate 10. The fixture guide 54 has the cam guide groove 55 for guiding the cam 52. The fixture guide 54 is basically in contact with an outer periphery of the cam 52 on the wall surface 55a of the cam guide groove 55 on the indoor side. However, the fixture guide 54 is not in contact with the outer periphery of the cam 52 in the middle while the movable window plate 20 moves between the insertion position and the extraction position. Instead, the fixture guide 54 is in contact with an outer periphery of at least one of the extension shaft 41 and the eccentric shaft 42 on a wall surface of the shaft guide groove 57.

As described above, while the drive shaft 60 revolves to rotate the rotating shaft 40, the fixture guide 54 is always in contact with an outer periphery of at least one of the cam 52, the extension shaft 41, and the eccentric shaft 42. Then, a distance L between the wall surface 55a of the cam guide groove 55 on the indoor side and the central axis of the rotating shaft 40 changes in response to a rotational angle of the rotating shaft 40. In response to a change of the distance L, the movable window plate 20 moves between the insertion position and the extraction position.

When the movable window plate 20 is located at the insertion position, the wall surface 55a of the cam guide groove 55 on the indoor side is in contact with the outer periphery of the cam 52 on both sides of the reference line SL. In this state, when the main surface of the movable window plate 20 on the outdoor side is pushed toward the indoor side, the rotating shaft 40 supported rotatably at a predetermined position for the movable window plate 20 is pushed toward the indoor side along the reference line SL. At this time, the cam 52 fixed at the rotating shaft 40, on both sides of the reference line SL, is pushed back to the wall surface 55a of the cam guide groove 55 on the indoor side. Therefore, the cam 52 can be prevented from rotating, the movable window plate 20 can be prevented from moving to the extraction position, and thereby an intrusion from outside can be prevented.

The fixture guide 54 has the shaft guide groove 57 for guiding the extension shaft 41 of the rotating shaft 40 and the eccentric shaft 42 on the groove bottom surface 55c of the cam guide groove 55. While the movable window plate 20 is slid in the Y-direction between the extraction position and the opening position, the elastic member 70 biases the rotating shaft 40 in a predetermined rotational direction (clockwise direction in FIGS. 7 to 9), thereby pressing the extension shaft 41 against the wall surface 57b of the shaft guide groove 57 on the outdoor side, and pressing the cam 52 against the wall surface 55a of the cam guide groove 55 on the indoor side. By the above-described configuration, looseness can be eliminated, and the movable window plate 20 can be prevented from vibrating.

An operation of the apparatus for window according to the embodiment is the same as the operation of the apparatus for window according to the first embodiment, and an explanation will be omitted.

As described above, embodiments or the like of the apparatus for window have been described. However, the present invention is not limited to the embodiments. Various variations and modifications may be made without departing from the scope of the present invention recited in claims.

Figure 10:
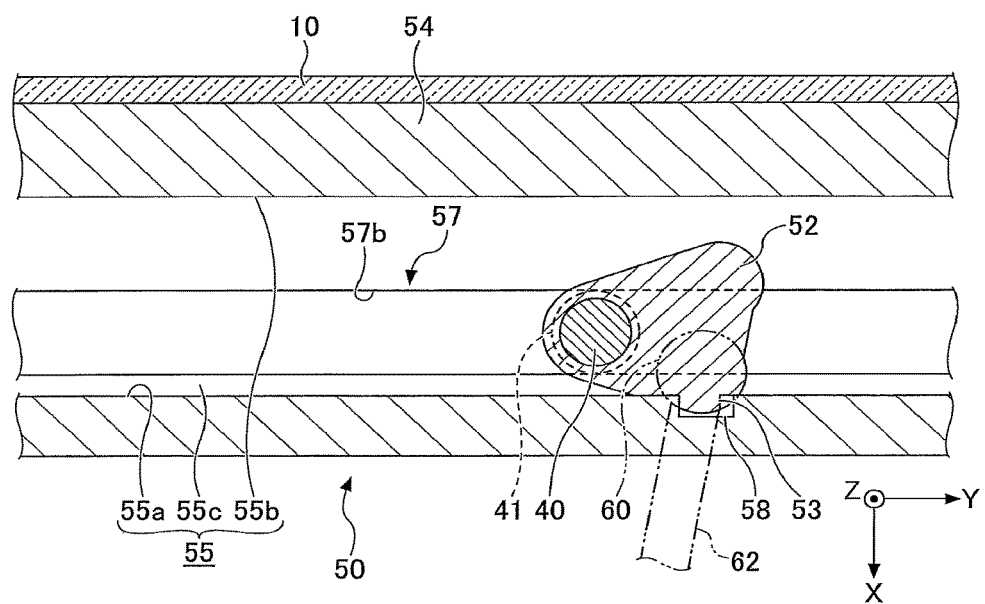
FIG. 10 is a cross-sectional diagram depicting a movement conversion mechanism according to a variation.

For example, as illustrated in FIG. 10, the cam 52 may have a fitting convex portion 53 on the outer periphery, and the fixture guide 54 may have a fitting concave portion 58 on the wall surface 55a of the cam guide groove 55 on the indoor side. In the middle while the movable window plate 20 is slid in the Y-direction between the extraction position and the opening position, by an elastic restoring force of the elastic member 70, the fitting convex portion 53 is fitted into the fitting concave portion 58. Therefore, the movable window plate 20 can be temporarily stopped at a specific position between the extraction position and the opening position.

When the movable window plate 20 is slid in the Y-direction again, the operator operates the operation member 62 against an elastic restoring force of the elastic member 70, to revolve the drive shaft 60 in the counter clockwise direction in FIG. 10. By the above-described operation, the rotating shaft 40 rotates in the counter clockwise direction in FIG. 10, and the fitting convex portion 53 comes away from the fitting concave portion 58.

In FIG. 10, the cam 52 may be provided with the eccentric shaft 42 in addition to the extension shaft 41.

Conventionally, a great operation force is required for inserting and extracting a movable window plate through an aperture of a fixed window plate.

According to the embodiment of the present invention, an apparatus for window in which an operation force for inserting and extracting a movable window plate through an aperture of a fixed window plate is reduced, is provided.

What is claimed is:

1. An apparatus for moving a movable window plate, comprising:
    a rotating shaft rotatably supported at a predetermined position for a movable window plate;
    a movement conversion mechanism comprising a cam fixed to the rotating shaft and having an extension shaft of the rotating shaft, and a fixture guide fixed to a fixed window plate and including a cam guide groove for guiding the cam in contact with an outer periphery of the cam on a wall surface of the cam guide groove on an indoor side direction of the fixed window plate and a shaft guide groove for guiding the extension shaft of the rotating shaft on a groove bottom surface of the cam guide groove such that the movement conversion mechanism is configured to convert a rotation of the rotating shaft into a translation of the movable window plate between an insertion position for being inserted into an aperture portion of the fixed window plate and an extraction position for being extracted from the aperture portion toward the indoor side direction of the fixed window plate;
    a drive shaft fixed to the rotating shaft and configured to rotate the rotating shaft around a central axis of the rotating shaft by revolving around the central axis of the rotating shaft; and
    an elastic member configured to press the extension shaft of the rotating shaft against a wall surface of the shaft guide groove on an outdoor side direction of the fixed window plate, and press the cam against the wall surface of the cam guide groove on the indoor side direction of the fixed window plate, while the movable window plate is slid between the extraction position and an opening position for being moved from the extraction position in a sliding direction that is different from an inserting and extracting direction to open an aperture portion of the fixed window plate,
    wherein the wall surface of the cam guide groove on the indoor side direction of the fixed window plate is parallel to a main surface of the fixed window plate, a distance between the wall surface of the cam guide grove on the indoor side direction of the fixed window plate and the central axis of the rotating shaft varies in response to a rotational angle of the rotating shaft, the cam has a fitting convex portion on the outer periphery, and the fixture guide has a fitting concave portion on the wall surface of the cam guide groove on the indoor side direction of the fixed window plate, and in a middle while the movable window plate is slid between the extraction position and the opening position, the fitting convex portion is fitted into the fitting concave portion by an elastic restoring force of the elastic member.

2. The apparatus for window according to claim 1, wherein when the movable window plate is located at the insertion position, the wall surface of the cam guide groove on the indoor side direction is in contact with the outer periphery of the cam on both sides of a reference line perpendicular to the main surface of the fixed window plate and through the central axis of the rotating shaft.

3. The apparatus for window according to claim 2, wherein the fixture guide has a convex portion on a wall surface of the cam guide groove on the outdoor side direction of the fixed window plate such that the convex portion is in contact with the outer periphery of the cam between the insertion position and the extraction position of the movable window plate, and the cam is configured to change a direction by climbing over the convex portion.

4. The apparatus for window according to claim 3, wherein the cam has an eccentric shaft eccentric to the extension shaft and having a shaft diameter of less than a shaft diameter of the extension shaft such that the eccentric shaft and the extension shaft are inserted into the shaft guide groove.

5. The apparatus for window according to claim 4, wherein the movable window plate moves from the insertion position to the extraction position through a protrusion position on an outdoor side of the insertion position by the rotation of the rotating shaft in a predetermined direction.

6. The apparatus for window according to claim 3, wherein the movable window plate moves from the insertion position to the extraction position through a protrusion position on an outdoor side of the insertion position by the rotation of the rotating shaft in a predetermined direction.

7. The apparatus for window according to claim 2, wherein the cam has an eccentric shaft eccentric to the extension shaft and having a shaft diameter of less than a shaft diameter of the extension shaft such that the eccentric shaft and the extension shaft are inserted into the shaft guide groove.

8. The apparatus for window according to claim 2, wherein the movable window plate moves from the insertion position to the extraction position through a protrusion position on an outdoor side of the insertion position by the rotation of the rotating shaft in a predetermined direction.

9. The apparatus for window according to claim 1, wherein the fixture guide has a convex portion on a wall surface of the cam guide groove on the outdoor side direction of the fixed window plate such that the convex portion is in contact with the outer periphery of the cam between the insertion position and the extraction position of the movable window plate, and the cam is configured to change a direction by climbing over the convex portion.

10. The apparatus for window according to claim 9, wherein the cam has an eccentric shaft eccentric to the extension shaft and having a shaft diameter of less than a shaft diameter of the extension shaft such that the eccentric shaft and the extension shaft are inserted into the shaft guide groove.

11. The apparatus for window according to claim 9, wherein the movable window plate moves from the insertion position to the extraction position through a protrusion position on an outdoor side of the insertion position by the rotation of the rotating shaft in a predetermined direction.

12. The apparatus for window according to claim 1, wherein the cam has an eccentric shaft eccentric to the extension shaft and having a shaft diameter of less than a shaft diameter of the extension shaft such that the eccentric shaft and the extension shaft are inserted into the shaft guide groove.

13. The apparatus for window according to claim 12, wherein the movable window plate moves from the insertion position to the extraction position through a protrusion position on an outdoor side of the insertion position by the rotation of the rotating shaft in a predetermined direction.

14. The apparatus for window according to claim 1, wherein the movable window plate moves from the insertion position to the extraction position through a protrusion position on an outdoor side of the insertion position by the rotation of the rotating shaft in a predetermined direction.

* * * * *